United States Patent
Koshisaka et al.

(10) Patent No.: US 11,119,955 B2
(45) Date of Patent: Sep. 14, 2021

(54) COMMUNICATION DEVICE, COMMUNICATION METHOD, PROGRAM, AND COMMUNICATION SYSTEM

(71) Applicant: Sony Semiconductor Solutions Corporation, Kanagawa (JP)

(72) Inventors: Naohiro Koshisaka, Kanagawa (JP); Hiroo Takahashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/618,585

(22) PCT Filed: May 25, 2018

(86) PCT No.: PCT/JP2018/020114
§ 371 (c)(1),
(2) Date: Dec. 2, 2019

(87) PCT Pub. No.: WO2018/225532
PCT Pub. Date: Dec. 13, 2018

(65) Prior Publication Data
US 2020/0133901 A1    Apr. 30, 2020

(30) Foreign Application Priority Data
Jun. 8, 2017  (JP) .............................. JP2017-113851

(51) Int. Cl.
*G06F 13/20*    (2006.01)
*G06F 13/42*    (2006.01)

(52) U.S. Cl.
CPC .......... *G06F 13/20* (2013.01); *G06F 13/4282* (2013.01)

(58) Field of Classification Search
CPC .............................. G06F 13/20; G06F 13/4282
See application file for complete search history.

(56) References Cited

U.S. PATENT DOCUMENTS

2009/0144471 A1* 6/2009 Lin .................. G06F 13/4252
710/110
2011/0161538 A1* 6/2011 Decker .............. G06F 11/2005
710/110
(Continued)

FOREIGN PATENT DOCUMENTS

JP        2017514238      6/2017
WO    2017/061330 A       1/2013
WO    2015/145347 A1     10/2015

OTHER PUBLICATIONS

MIPI Alliance "Specification for I3Csm, Improved Inter Integrated Circuit" Version 1.0 Dec. 23, 2016.
(Continued)

*Primary Examiner* — Henry Tsai
*Assistant Examiner* — Christopher A Daley
(74) *Attorney, Agent, or Firm* — Michael Best & Friedrich LLP

(57) ABSTRACT

To perform communication more definitely and efficiently. In a case of transferring a communication initiative in accordance with a request by a secondary master, a master determines whether or not the secondary master that has performed the request has a group management capability. Then, when it is determined that the secondary master has no group management capability, the master instructs all communication devices connected to a bus to reset a group address, and when it is determined that the secondary master has the group management capability, the master transfers the communication initiative in a state in which the group address is set. The present technology is, for example, applicable to a bus IF.

18 Claims, 10 Drawing Sheets

(56) References Cited

U.S. PATENT DOCUMENTS

| | | | |
|---|---|---|---|
| 2015/0100862 A1* | 4/2015 | Sengoku | G06F 13/4221 |
| | | | 714/807 |
| 2015/0309960 A1 | 10/2015 | Pitigoi-Aron et al. | |
| 2015/0339248 A1 | 11/2015 | Choi | |
| 2016/0217090 A1 | 7/2016 | Sengoku et al. | |
| 2018/0203818 A1* | 7/2018 | Fukuda | G05B 19/41855 |
| 2018/0275990 A1* | 9/2018 | Peixoto Machado Da Silva | |
| | | | G06F 13/4282 |
| 2019/0002061 A1* | 1/2019 | Roodenburg | E21B 19/004 |

OTHER PUBLICATIONS

Japanese Office Action dated Jul. 6, 2021 for corresponding Japanese Application No. 2017-113851.

Taiwanese Office Action dated Jun. 18, 2021 for corresponding Taiwanese Application No. 11020570900.

* cited by examiner

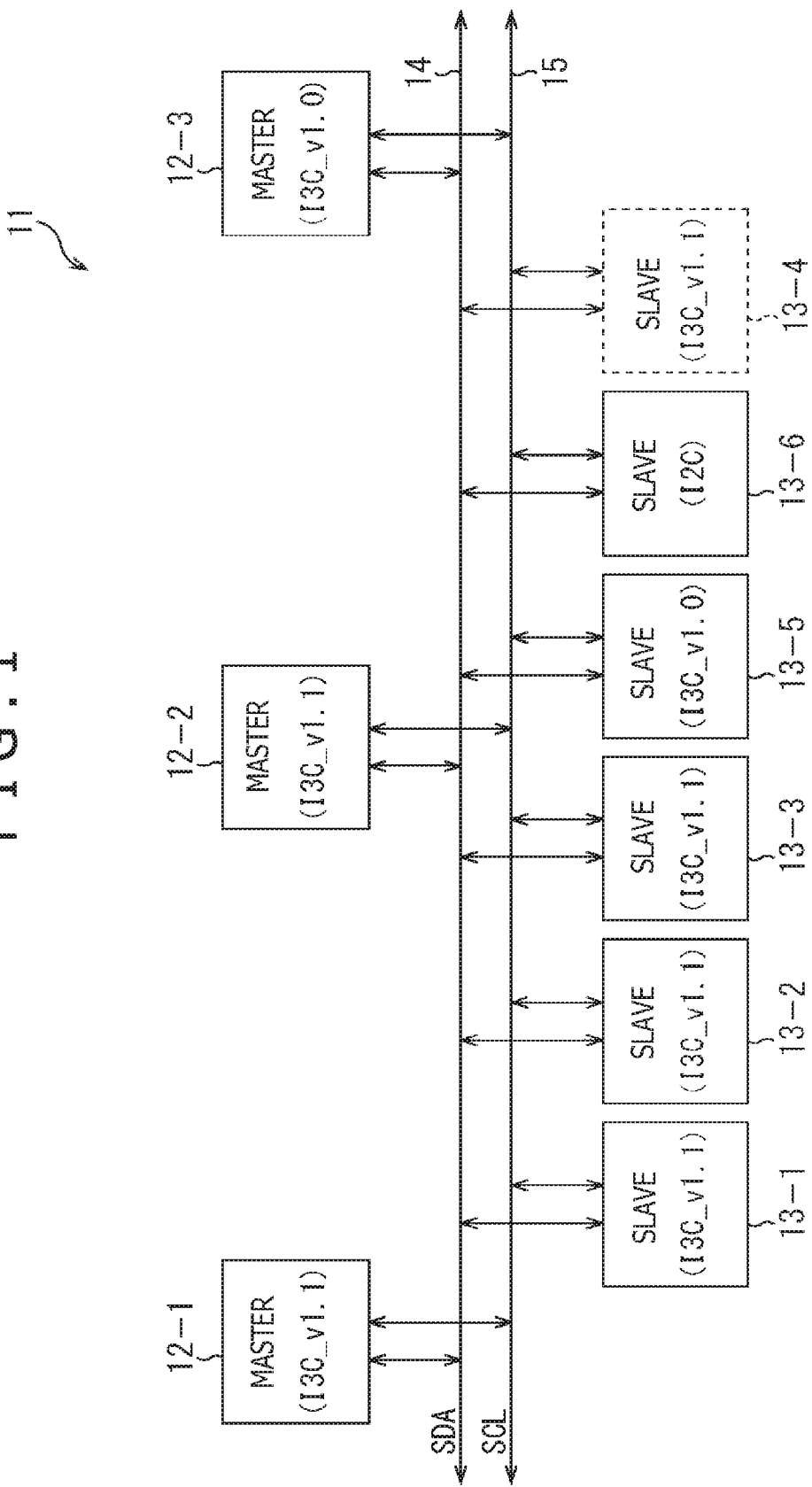

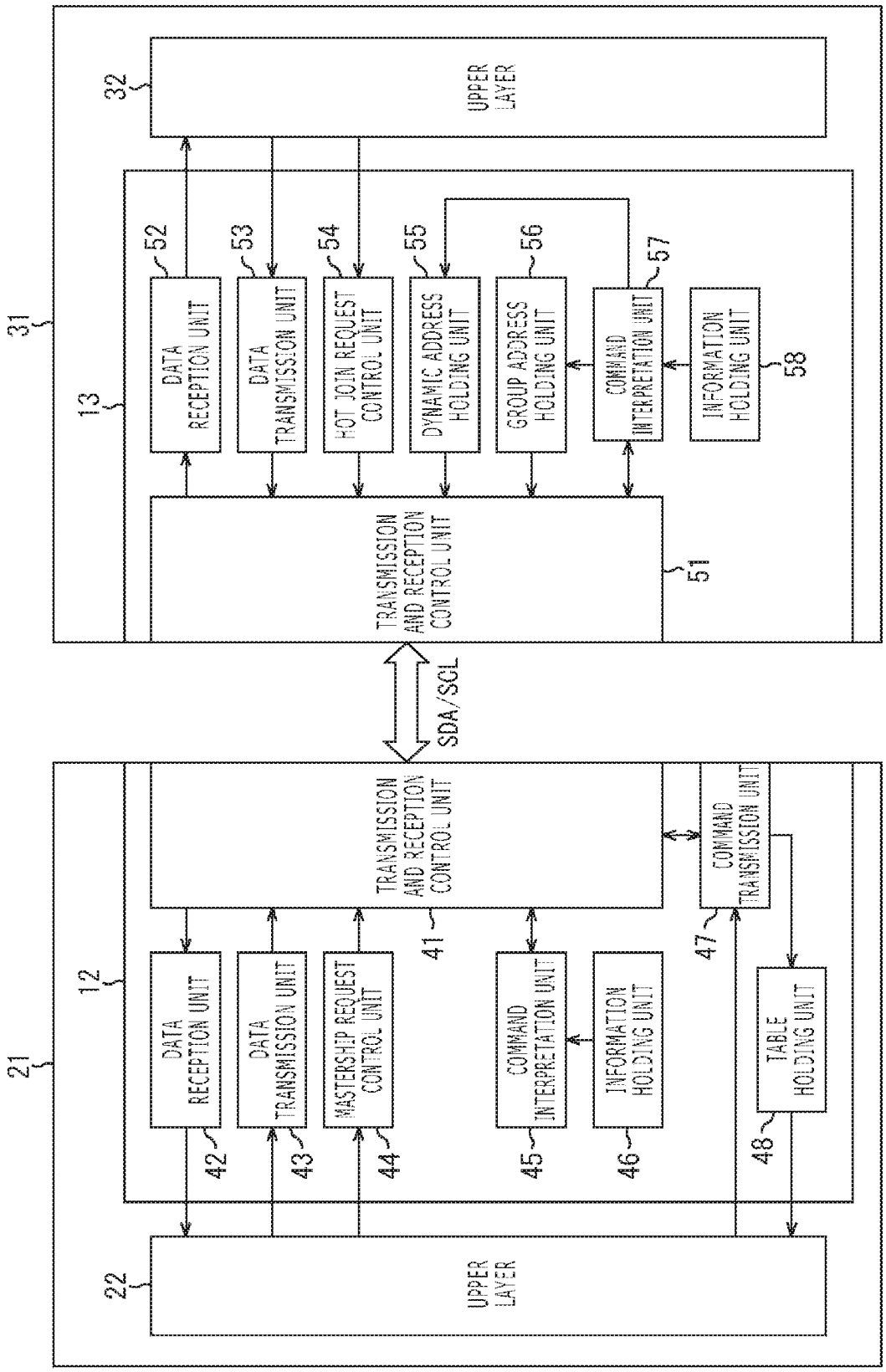

| CURRENT MASTER | DEVICE A | | | | GROUP INFORMATION EFFECTIVENESS | GROUP MANAGEMENT CAPABILITY | GROUP-BELONGING-CAPABILITY | GRPA |
|---|---|---|---|---|---|---|---|---|
| DEVICE | FUNCTION | | SA | DA | | | | |
| A | I3C MAIN MASTER | | ABSENT | DA VALUE | PRESENT | PRESENT | ABSENT | ABSENT |
| B | I3C SECONDARY MASTER | | ABSENT | DA VALUE | PRESENT | PRESENT | ABSENT | ABSENT |
| C | I3C SECONDARY MASTER | | ABSENT | DA VALUE | PRESENT | ABSENT | ABSENT | ABSENT |
| D | I3C SLAVE | | ABSENT | DA VALUE | PRESENT | ABSENT | PRESENT | GRPA VALUE |
| E | I3C SLAVE | | ABSENT | DA VALUE | PRESENT | ABSENT | PRESENT | GRPA VALUE |
| F | I3C SLAVE | | SA VALUE | DA VALUE | PRESENT | ABSENT | PRESENT | GRPA VALUE |
| G | I3C SLAVE | | SA VALUE | DA VALUE | PRESENT | ABSENT | ABSENT | ABSENT |
| H | I2C SLAVE | | SA VALUE | ABSENT | PRESENT | ABSENT | ABSENT | ABSENT |

B

| CURRENT MASTER | DEVICE A | |
|---|---|---|
| DEVICE | FUNCTION | SA | DA |
| A | I3C MAIN MASTER | ABSENT | DA VALUE |
| B | I3C SECONDARY MASTER | ABSENT | DA VALUE |
| C | I3C SECONDARY MASTER | ABSENT | DA VALUE |
| D | I3C SLAVE | ABSENT | DA VALUE |
| E | I3C SLAVE | ABSENT | DA VALUE |
| F | I3C SLAVE | SA VALUE | DA VALUE |
| G | I3C SLAVE | SA VALUE | DA VALUE |
| H | I2C SLAVE | SA VALUE | ABSENT |

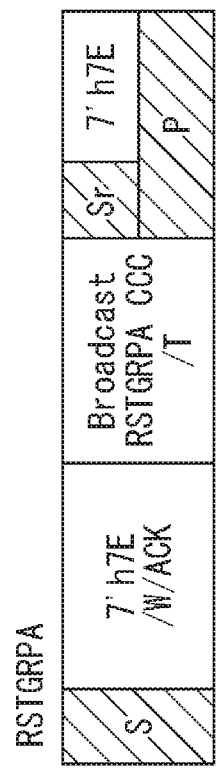
F I G. 7
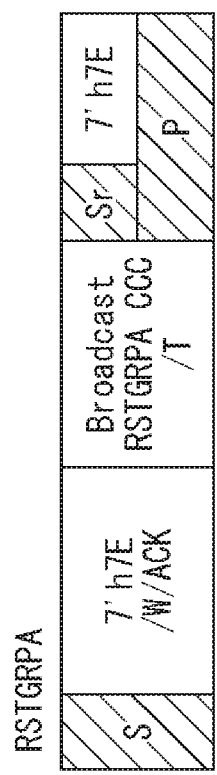
F I G. 6

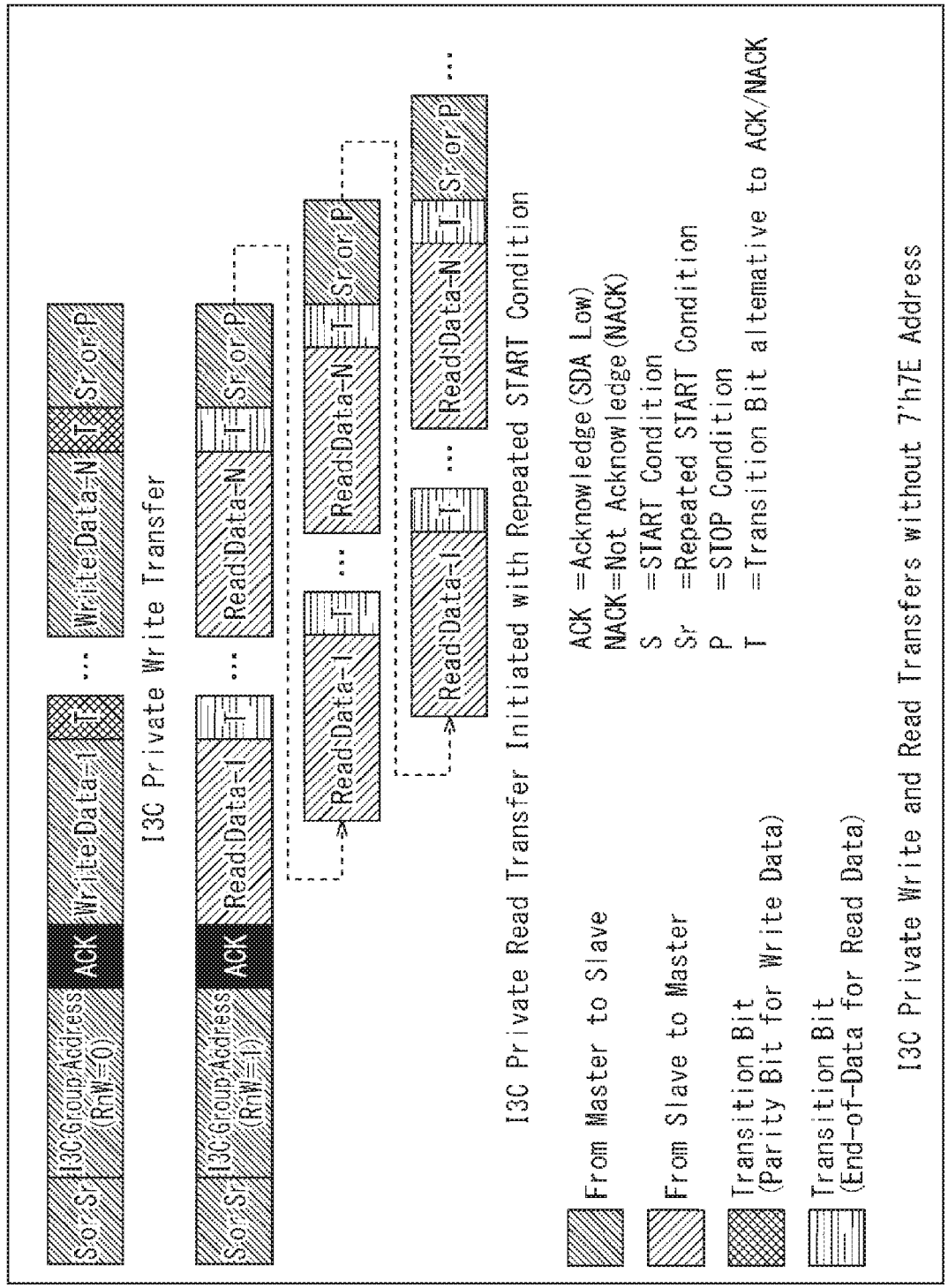

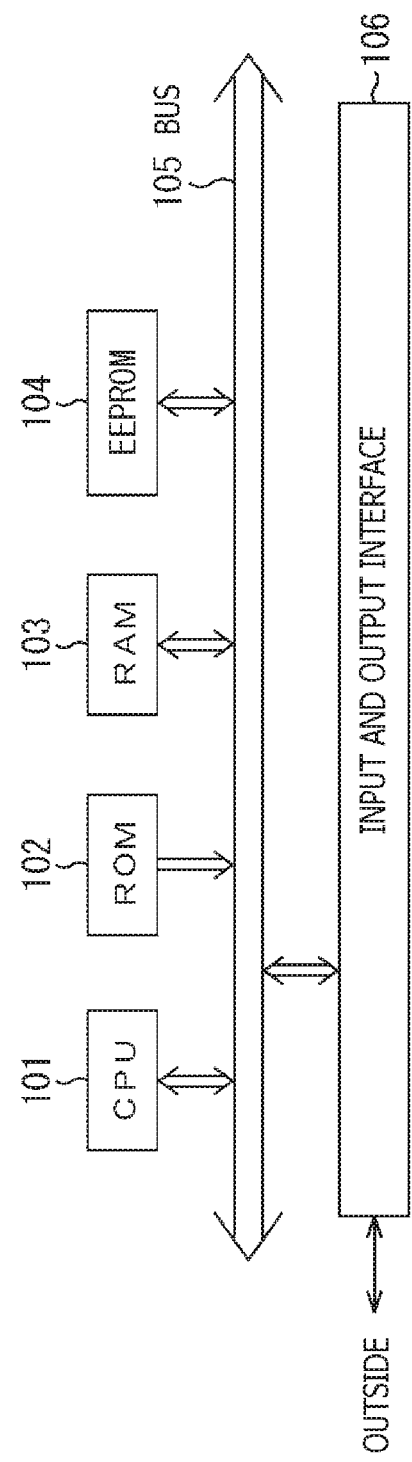

COMMUNICATION DEVICE, COMMUNICATION METHOD, PROGRAM, AND COMMUNICATION SYSTEM

TECHNICAL FIELD

The present disclosure relates to a communication device, a communication method, a program, and a communication system, and more particularly to a communication device, a communication method, a program, and a communication system aiming at enabling communication to be more definitely and efficiently performed.

BACKGROUND ART

Conventionally, a CCI (Camera Control Interface) has been widely used as a bus IF (Interface) for controlling a register in various devices and an I2C (Inter-Integrated Circuit) standard has been adopted for a physical layer in the CCL. In addition, recently, speeding up of I2C has been requested to be realized, regulations of I3C (Improved Inter Integrated Circuit) are plotted out as a next-generation standard, and a revision thereof has been promoted.

For example, I2C and I3C are configured so as to perform communication with a slave connected to the bus IF under the control by a master having a communication initiative through the bus IF. Further, in I3C, a function of maintaining compatibility so as to perform communication with a device of I2C, a function referred to as hot join capable of joining in the bus IF on the way by the slave, a function of mutually transferring a master authority between a plurality of masters, or the like is provided.

Also, in PTL 1, in I3C, an error detection method is defined so that a communication failure is avoided coming along with an error detection of a start or stop of communication or the like, and thereby a communication device capable of performing communication more definitely is disclosed.

CITATION LIST

Patent Literature

PTL 1: PCT Patent Publication No. WO02017/061330

SUMMARY OF INVENTION

Technical Problem

Meanwhile, in a current standard of I3C, it is regulated that communication is performed setting to a destination all the devices connected to the bus IF and communication is performed setting to a destination a single arbitrary device connected to the bus IF.

Therefore, for example, when a write of the same contents is desired to be performed in a plurality of arbitrary devices connected to the bus IF, a master has to repeatedly perform a write transfer individually to their devices. Accordingly, in order to enable communication to be efficiently performed, it is considered that a method for performing communication setting to a destination a plurality of arbitrary devices is established. Then, it is necessary to avoid a communication error concerned to occur accompanying a performance of communication by such a method and to definitely perform communication.

The present disclosure has been made in view of the circumstances as described above and aims at enabling communication to be more definitely and efficiently performed.

Solution to Problem

According to a first aspect of the present disclosure, there is provided a communication device having a communication initiative through a bus, in which communication is performed with another communication device that performs communication under control of the communication device, another particular communication device that is capable of functioning as the communication device when the communication initiative is transferred from the communication device and performs communication under control of the communication device when having no communication initiative is treated as the other communication device in a state of having no communication initiative, and the communication device has a group management capability capable of managing a group address for performing a write transfer and performing communication setting a plurality of the other arbitrary communication devices to one group and setting the group to a destination, the communication device including: a transmission and reception control unit configured to control transmission and reception of a signal with the other communication device; and a processing execution unit configured to execute a process for determining whether or not the other particular communication device that has performed a request has the group management capability in a case of transferring the communication initiative in accordance with the request by the other particular communication device, and a process for instructing the other communication device belonging to at least one group to reset the group address when it is determined that the other particular communication device has no group management capability.

According to a first aspect of the present disclosure, there is provided a communication method performed by a communication device having a communication initiative through a bus, or a program causing a computer built in a communication device having a communication initiative through a bus to execute a process, in which communication is performed with another communication device that performs communication under control of the communication device, another particular communication device that is capable of functioning as the communication device when the communication initiative is transferred from the communication device and performs communication under control of the communication device when having no communication initiative is treated as the other communication device in a state of having no communication initiative, and the communication device has a group management capability capable of managing a group address for performing a write transfer and performing communication setting a plurality of the other arbitrary communication devices to one group and setting the group to a destination, the communication method or the process including the steps of: controlling transmission and reception of a signal with the other communication device; determining whether or not the other particular communication device that has performed a request has the group management capability in a case of transferring the communication initiative in accordance with the request by the other particular communication device; and instructing the other communication device belonging to at least one group to reset the group address when it is determined that the other particular communication device has no group management capability.

According to a first aspect of the present disclosure, there is provided a communication system in which communication is performed by a communication device having a communication initiative through a bus and another communication device that performs communication under control of the communication device, in which another particular communication device that is capable of functioning as the communication device when the communication initiative is transferred from the communication device and performs communication under control of the communication device when having no communication initiative is treated as the other communication device in a state of having no communication initiative, the communication device has a group management capability capable of managing a group address for performing a write transfer and performing communication setting a plurality of the other arbitrary communication devices to one group and setting the group to a destination, and the communication device includes: a transmission and reception control unit configured to control transmission and reception of a signal with the other communication device; and a processing execution unit configured to execute a process for determining whether or not the other particular communication device that has performed a request has the group management capability in a case of transferring the communication initiative in accordance with the request by the other particular communication device, and a process for instructing the other communication device belonging to at least one group to reset the group address when it is determined that the other particular communication device has no group management capability.

According to a first aspect of the present disclosure, transmission and reception of a signal is controlled with another communication device that performs communication under control of a communication device; whether or not another particular communication device that has performed a request has a group management capability is determined in a case of transferring a communication initiative in accordance with the request by the other particular communication device; and the other communication device belonging to at least one group is instructed to reset the group address when it is determined that the other particular communication device has no group management capability.

According to a second aspect of the present disclosure, there is provided a communication device that is capable of functioning as another particular communication device when a communication initiative is transferred from the other particular communication device having the communication initiative through a bus and performs communication under control of the other particular communication device when having no communication initiative, in which the communication device has a group management capability capable of managing a group address for performing a write transfer and performing communication setting a plurality of other arbitrary communication devices to one group and setting the group to a destination, the communication device including: a transmission and reception control unit configured to control transmission and reception of a signal with the other particular communication device; and a processing execution unit configured to execute a process for requesting the communication initiative from the other particular communication device, and a process for acquiring, in a case of obtaining the communication initiative and starting to behave as the other particular communication device when the group-related capability information associated with the group address of the other communication device joining in the bus is insufficient, the insufficient group-related capability information.

According to a second aspect of the present disclosure, there is provided a communication method performed by a communication device that is capable of functioning as another particular communication device when a communication initiative is transferred from the other particular communication device having the communication initiative through a bus and performs communication under control of the other particular communication device when having no communication initiative, or a program for causing a computer built in a communication device to execute a process, in which the communication device has a group management capability capable of managing a group address for performing a write transfer and performing communication setting a plurality of other arbitrary communication devices to one group and setting the group to a destination, the communication method or the process including the steps of: controlling transmission and reception of a signal with the other particular communication device; requesting the communication initiative from the other particular communication device; and acquiring, in a case of obtaining the communication initiative and starting to behave as the other particular communication device when group-related capability information associated with the group address of the other communication device joining in the bus is insufficient, the insufficient group-related capability information.

According to a second aspect of the present disclosure, there is provided a communication system in which communication is performed by another particular communication device having a communication initiative through a bus, another communication device that performs communication under control of the communication device, and the communication device that is capable of functioning as the other particular communication device when the communication initiative is transferred from the other particular communication device having the communication initiative through a bus and performs communication under control of the other particular communication device when having no communication initiative, in which the communication device has a group management capability capable of managing a group address for performing a write transfer and performing communication setting a plurality of other arbitrary communication devices to one group and setting the group to a destination, and the communication device includes: a transmission and reception control unit configured to control transmission and reception of a signal with the other particular communication device; and a processing execution unit configured to execute a process for requesting the communication initiative from the other particular communication device, and a process for acquiring, in a case of obtaining the communication initiative and starting to behave as the other particular communication device when group-related capability information associated with the group address of the other communication device joining in the bus is insufficient, the insufficient group-related capability information.

According to a second aspect of the present disclosure, transmission and reception of a signal is controlled with another particular communication device, a communication initiative is requested from the other particular communication device, and in a case of obtaining the communication initiative and starting to behave as the other particular communication device when group-related capability information associated with a group address of another communication device joining in a bus is insufficient, the insufficient group-related capability information is acquired.

Advantageous Effects of Invention

According to an aspect of the present disclosure, communication can be performed more definitely and efficiently.

Note that effects here described are not necessarily limited and may be any effect described in the present disclosure.

BRIEF DESCRIPTION OF DRAWINGS

FIG. 1 is a block diagram illustrating a configuration example of an embodiment of a bus IF to which the present technology is applied.

FIG. 2 is a block diagram illustrating a configuration example of a master and a slave.

FIG. 3 is a diagram illustrating an example of a table in which device information is registered.

FIG. 6 is a diagram illustrating a first format example of a RSTGRPA command.

FIG. 7 is a diagram illustrating a second format example of the RSTGRPA command.

FIG. 10 is a diagram illustrating an example of the communication format in the write transfer and the readout transfer.

FIG. 11 is a block diagram illustrating a configuration example of an embodiment of a computer to which the present technology is applied.

DESCRIPTION OF EMBODIMENT

Figure 4:
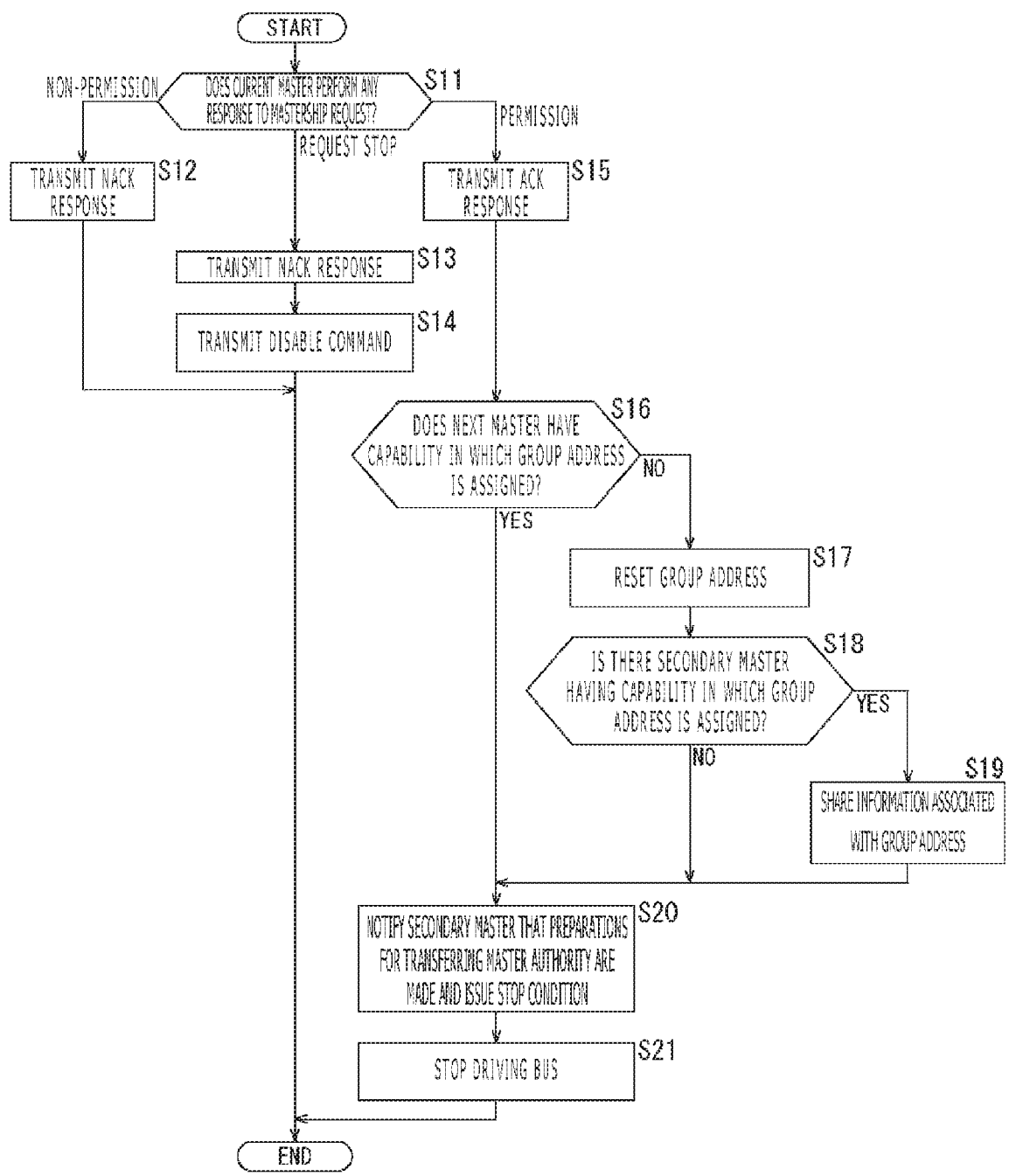
FIG. 4 is a flowchart describing a process at the time of receiving a mastership request.

Hereinafter, a specific embodiment to which the present technology is applied will be described in detail with reference to the accompanying drawings.

<Configuration Example of Bus IF>

FIG. 1 is a block diagram illustrating a configuration example of an embodiment of a bus IF to which the present technology is applied.

In the bus IF 11 illustrated in FIG. 1, three masters 12-1 to 12-3 and six slaves 13-1 to 13-6 are connected through a data signal line 14 for transmitting serial data SDA and a clock signal line 15 for transmitting a serial clock SCL.

The masters 12-1 and 12-2 and the slaves 13-1 to 13-4 conform to the standard (I3C_v1.1) of I3C of a newly proposed version. Also, the master 12-3 and the slave 13-5 conform to the standard (I3C_v1.0) of I3C of a current version, and the slave 13-6 conforms to the standard of I2C. As described above, even if the devices conforming to I3C_v1.1, the devices conforming to I3C_v1.0, and the device conforming to the standard of I2C are mixed, the bus IF 11 is configured so as to be operated.

In addition, in I3C, hot join that is a function capable of joining in the bus IF 11 in a state of being operated on the way is regulated. The slave 13-4 illustrated in FIG. 1 by a broken line indicates, for example, a state in which the slave 13-4 is powered off and does not join in the bus IF 11. After power-on, the slave 13-4 can transmit a hot join request and join in the bus IF 11.

The masters 12-1 to 12-3 include a function of vigorously controlling communication through the bus IF 11 and the slaves 13-1 to 13-6 can perform communication through the bus IF 11 under the control of a single master having the initiative of the masters 12-1 to 12-3. Note that, hereinafter appropriately, when the masters 12-1 to 12-3 do not need to be differentiated, they are simply referred to as the masters 12, whereas when the slaves 13-1 to 13-6 do not need to be differentiated, they are simply referred to as the slaves 13.

In addition, from among the masters 12-1 to 12-3, one master 12 having the communication initiative (hereinafter, referred to as a master authority) in the bus IF 11 is referred to as a current master 12C and the other masters 12 are referred to as a secondary master 12S. For example, the secondary master 12S having no master authority can perform communication through the bus IF 11 under the control of the current master 12C, and when the master authority is transferred from the current master 12C, the secondary master 12S functions as the current master 12C. As described above, the master 12 functions as the current master 12C in the state of having the communication initiative and the secondary master 12S in the state of having no communication initiative is treated in the similar manner as in the slave 13. Accordingly, in the present embodiment, also the secondary master 12S that performs communication under control of the current master 12C will be described being included in the slave 13.

Here, hereinafter appropriately, the slaves 13-1 to 13-4 conforming to I3C_v1.1 and the slave 13-5 conforming to I3C_v1.0 are also referred to as I3C slave 13. Further, the devices (that is, the master 12 and the I3C slave 13) conforming to any of I3C_v1.1 and I3C_v1.0 are also referred to as the I3C device.

Meanwhile, in I3C_v1.1, setting a plurality of arbitrary I3C slaves 13 to a destination, the current master 12C is examined to set and operate a group address that enables a write transfer to be concurrently performed to their I3C slaves 13.

Figure 8:
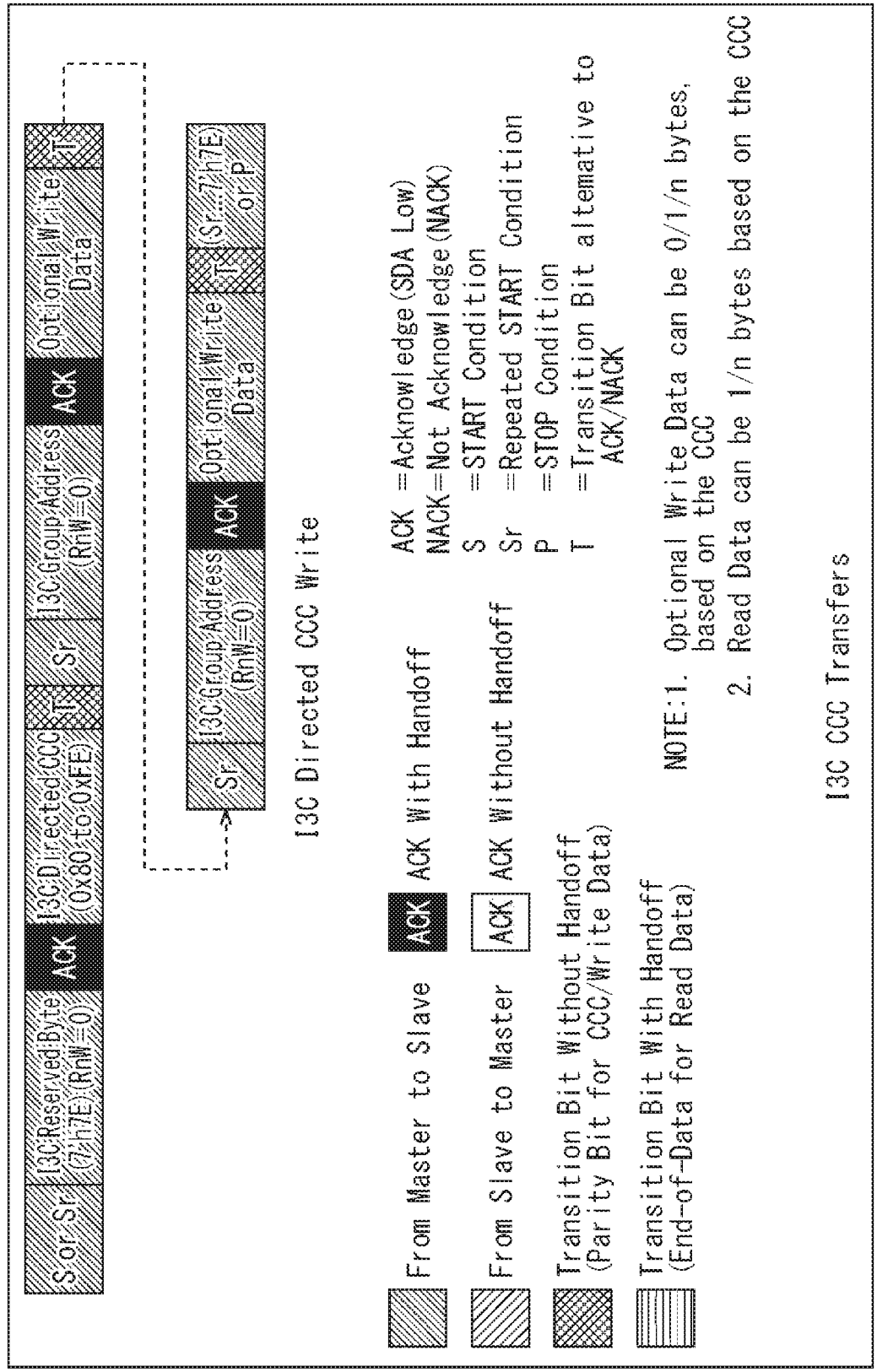
FIG. 8 is a diagram illustrating an example of a communication format in a write transfer.

That is, by defining a SETGRPA command of formats as illustrated in FIGS. 6 to 8 to be described below, the same group address is set to a plurality of I3C slaves 13 belonging to the same group. For example, by setting the dynamic address for each group, the dynamic address can be used as the group address. Note that a single I3C slave 13 can belong to a plurality of groups and at least one or more of group addresses can be assigned to the single I3C slave 13.

For example, the current master 12C sets the group address to respective groups by using the SETGRPA command. Then, on the occasion of performing various types of write transfers (Direct Write CCC/Private Write/HDR Write) regulated by I3C, the current master 12C designates the group address to a slave address field of the command of the write transfer. Through this process, the current master 12C can concurrently write data in a plurality of I3C slaves 13 belonging to the group by a one-time write transfer.

Meanwhile, the I3C slave 13 receives communication relating to an address 7'h7E for designating all the I3C slaves 13 joining in the bus IF 11, the dynamic address of the I3C slave 13 itself, or the group address to which the I3C slave 13 itself belongs and executes processing according to contents of the communication.

In addition, when the current master 12C performs designation using the group address and transmits the readout command to the plurality of I3C slaves 13, the readout data transferred from the plurality of I3C slaves 13 is estimated to conflict. Therefore, an operation is assumed in which on the occasion of performing various types of readout transfer (Direct Read CCC/Private Read/HDR Read) regulated by I3C, the group address is prohibited to be designated to a slave address field of the command of the readout transfer.

Figure 9:
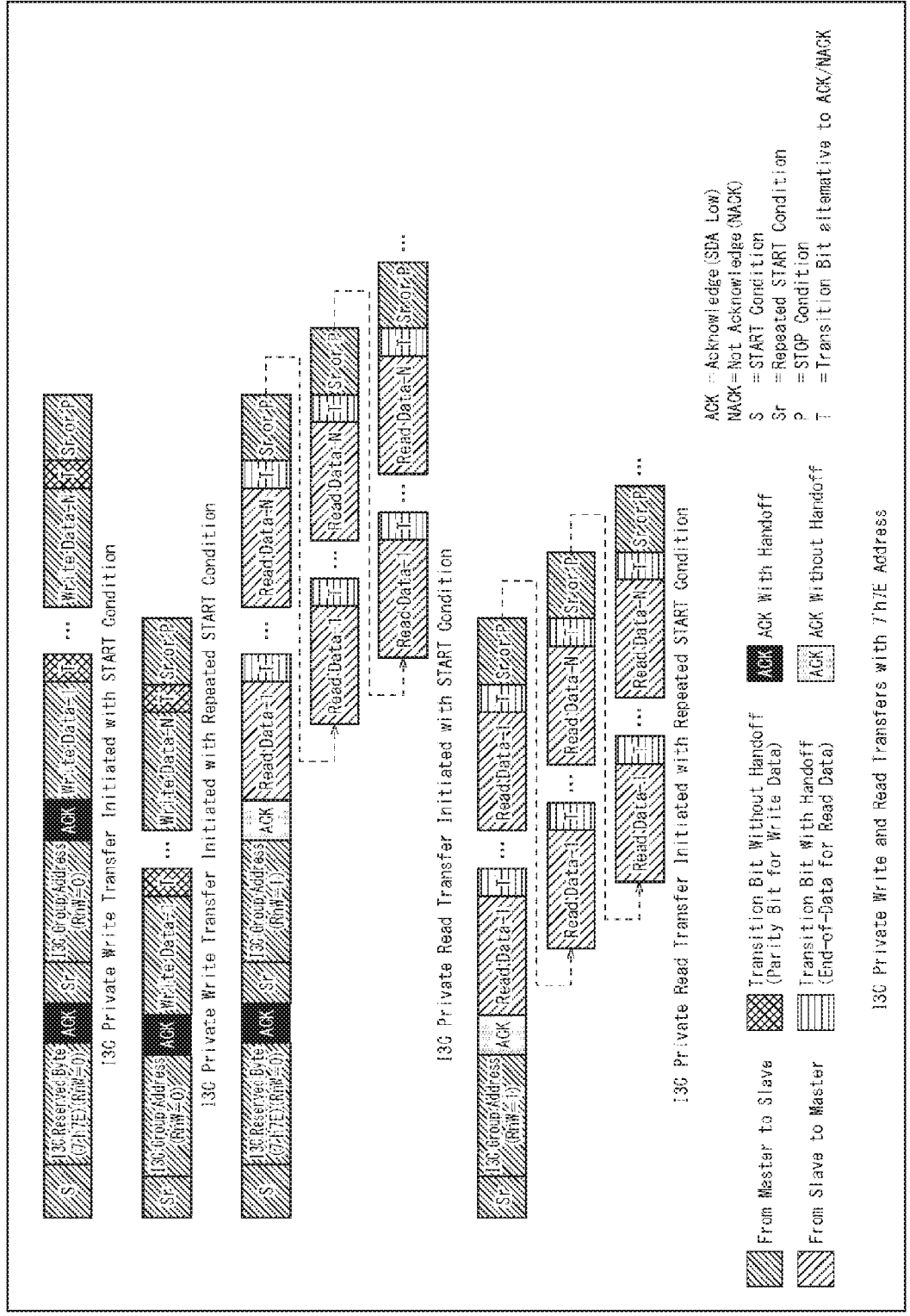
FIG. 9 is a diagram illustrating an example of a communication format in the write transfer and a readout transfer.

Note that, as illustrated in FIG. 9 and FIG. 10 to be described below, when a timing at which the readout data is output for each of the plurality of I3C slaves 13 is controlled, the conflict of the readout data can be avoided. In this case, on the occasion of performing various types of readout transfer, the bus IF 11 can be operated without prohibiting designating the group address. Further, a register etc. may be installed to enable the readout transfer in which the group address is designated.

Meanwhile, the bus IF 11 illustrated in FIG. 1 is formed as a mixture of the masters 12-1 and 12-2 and I3C slaves 13-1 to 13-4 conforming to I3C_v1.1 in which a function relating to the group address is regulated, the master 12-3 and I3C slave 13-5 conforming to I3C_v1.0 in which the function relating to the group address is not regulated, and the I2C slave 13-6 conforming to the standard of I2C.

In the bus IF 11 configured as described above, in order to perform an assignment of the group address through the masters 12-1 and 12-2, I3C_v1.1 needs to be regulated so as to recognize the I3C device corresponding to the group address of all the masters 12 and slaves 13 joining in the bus IF 11.

In addition, when a plurality of masters 12 joining in the bus IF 11 correspond to the group address, I3C_v1.1 needs to be regulated so that those masters 12 can mutually recognize the group address to which the other masters 12 assign. That is, there is a concern that when some masters 12 cannot recognize the group address assigned by the other masters 12, an already used address value has been used for the group address and a communication error occurs. In addition, there is a concern that the group address set by some masters 12 is rewritten by the other masters 12, and thereby group address information is broken and the communication error occurs.

In order to solve the problems, when operating the group address, the masters 12-1 and 12-2 conforming to I3C_v1.1 are configured so that a corresponding state to the group address can be recognized and the communication error concerned to occur due to the usage of the group address can be avoided. This process permits the communication error to be definitely avoided and communication to be efficiently performed using the group address in the bus IF 11.

<Configuration Example of Master and Slave>

FIG. 2 is a block diagram illustrating a configuration example of the master 12 and the slave 13.

In a configuration illustrated in FIG. 2, the master 12 is incorporated as a physical layer of the master device 21 and the master device 21 includes an upper layer 22 (for example, a CCI layer) that is in an upper position to the master 12. In the similar manner, the slave 13 is incorporated as a physical layer of the slave device 31 and the slave device 31 includes an upper layer 32 (for example, a CCI layer) that is in an upper position to the slave 13.

As illustrated in FIG. 2, the master 12 includes a transmission and reception control unit 41, a data reception unit 42, a data transmission unit 43, a mastership request control unit 44, a command interpretation unit 45, an information holding unit 46, a command transmission unit 47, and a table holding unit 48. Note that each unit or a portion of these units may be realized, for example, by using a semiconductor integrated circuit, a programmable semiconductor integrated circuit, software, or the like.

The transmission and reception control unit 41 controls transmission and reception of signals with the other devices connected to the bus IF 11. For example, the transmission and reception control unit 41 drives the clock signal line 15, transmits the serial clock SCL, and drives the data signal line 14 in accordance with a timing of the serial clock SCL, and thereby controls transmission of the serial data SDA to the other devices. In addition, in accordance with the timing of the serial clock SCL, the transmission and reception control unit 41 controls the reception of the serial data SDA that is transmitted by driving the data signal line 14 through the other devices.

Under the control of the transmission and reception control unit 41, the data reception unit 42 receives data transmitted from the other devices and supplies the data to the upper layer 22.

Under the control of the transmission and reception control unit 41, the data transmission unit 43 transmits the data supplied from the upper layer 22 to the other devices.

In accordance with a request from the upper layer 22, when the master 12 is the secondary master 12S, the mastership request control unit 44 performs control relating to transmission of a mastership request for requesting the master authority to be transferred from the current master 12C.

The command interpretation unit 45 performs an interpretation of the command received under the control of the transmission and reception control unit 41 and executes processing according to the command with reference to various types of information held by the information holding unit 46.

The information holding unit 46 can hold various types of information required for executing processing according to the command through the command interpretation unit 45. In the information holding unit 46, for example, there is held group-related capability information that is a capability relating to the group and is information indicating a capability included in the master 12 itself. For example, when the master 12 itself has a capability (hereinafter, also referred to as a group management capability) for assigning the group address, the group-related capability information indicating that the group management capability is included is held by the information holding unit 46.

In accordance with the request from the upper layer 22, the command transmission unit 47 transmits the command through the bus IF 11 under the control of the transmission and reception control unit 41. In addition, in accordance with the command transmitted from the master 12, for example, the command transmission unit 47 supplies the group-related capability information transmitted from the device joining in the bus IF 11 to the table holding unit 48.

The table holding unit 48 holds a device information table (refer to FIG. 3 to be described below) in which the device information associated with respective devices is registered, while associated to all the devices joining in the bus IF 11. In the device information table, for example, the device information including the group-related capability information, the group address, or the like is registered, while associated to a device ID (Identification) that identifies the device. Then, the table holding unit 48 holds the group-related capability information of each device supplied from the command transmission unit 47 in the device information table, and at the same time notifies also the upper layer 22 of the group-related capability information.

The slave 13 includes a transmission and reception control unit 51, a data reception unit 52, a data transmission unit 53, a hot join request control unit 54, a dynamic address holding unit 55, a group address holding unit 56, a command interpretation unit 57, and an information holding unit 58. Note that each unit or a portion of these units may be realized, for example, by using a semiconductor integrated circuit, a programmable semiconductor integrated circuit, software, or the like.

The transmission and reception control unit 51 controls transmission and reception of signals with the other devices connected to the bus IF 11. For example, in accordance with the timing of the serial clock SCL, the transmission and reception control unit 51 controls reception of the serial data SDA transmitted by driving the data signal line 14 through the other devices. Also, in accordance with the timing of the serial clock SCL, the transmission and reception control unit 51 drives the data signal line 14 and thereby controls transmission of the serial data SDA to the other devices.

Under the control of the transmission and reception control unit 41, the data reception unit 52 receives data transmitted from the other devices and supplies the data to the upper layer 32.

Under the control of the transmission and reception control unit 41, the data transmission unit 53 transmits the data supplied from the upper layer 32 to the other devices.

The hot join request control unit 54 performs, for example, control relating to the transmission of the hot join request for requesting the slave 13 in the state of not joining in the bus IF 11 to join in the bus IF 11 in the operating state.

The dynamic address holding unit 55 can hold the dynamic address assigned to the slave 13 and appropriately holds the dynamic address in accordance with an instruction by the command interpretation unit 57.

The group address holding unit 56 can hold the group address assigned to the slave 13 and appropriately holds the group address in accordance with the instruction by the command interpretation unit 57.

The command interpretation unit 57 performs an interpretation of the command received under the control of the transmission and reception control unit 51, refers to various types of information held by the information holding unit 58, and executes processing according to the command.

The information holding unit 58 can hold various types of information required for executing processing according to the command through the command interpretation unit 57. In the information holding unit 58, for example, there is held the group-related capability information that is information indicating a capability that relates to the group and is included in the slave 13 itself. For example, when the slave 13 itself has the capability (hereinafter, also referred to as a group-belonging capability) to which the group address is assigned, the group-related capability information indicating that the group-belonging capability is included is held by the information holding unit 58.

Here, the device information table held by the table holding unit 48 will be described with reference to FIG. 3. In FIG. 3A, an example of the device information table held by the table holding unit 48 of the masters 12-1 and 12-2 conforming to I3C_v1.1 is illustrated and in FIG. 3B, an example of the device information table held by the table holding unit 48 of the master 12-3 conforming to I3C_v1.0 is illustrated.

As illustrated in FIG. 3A, in the device information table of I3C__v1.1, the device ID (in an example of FIG. 3, the device ID: A to H) identifying all the devices joining in the bus IF 11 is registered. Then, while associated to respective device IDs, function information, a static address (SA), the dynamic address (DA), group information effective information, group management capability information, group-belonging capability information, and a group address (GRPA) are registered as the device information. In addition, in this device information table, the device ID (in an example of FIG. 3, the device ID: A) of the master 12 that is the current master 12C is registered.

In the function information, the device information indicating functions included in the device joining in the bus IF 11 is registered and, for example, the device information indicating any of an I3C main master, an I3C secondary master, an I3C slave, and an I2C slave is registered.

In the static address, the address value (SA value) indicating the static address included in the device is registered as the device information, and in addition thereto, the device information (none) indicating the fact is registered with regard to the device having no static address.

In the dynamic address, the address value (DA value) indicating the dynamic address assigned to the device is registered as the device information, and in addition thereto, the device information (none) indicating the fact is registered with regard to the device (I2C device) incapable of having the dynamic address. In addition, when the dynamic address can be included but the dynamic address is not yet assigned, the device information (not yet) indicating the fact is registered in the dynamic address.

In the group information effective information, the device information (present) indicating that the device information registered in the group management capability information, the group-belonging capability information, and the group address is effective or the device information (absent) indicating that their device information is not yet acquired is registered.

In the group management capability information, the device information (present) indicating that the device has a capability to which the group address is assigned or the device information (absent) indicating that the device has no capability to which the group address is assigned is registered. In addition, with regard to the device in which the group management capability information is not acquired, the group management capability information is left blank.

In the group-belonging capability information, the device information (present) indicating that the device has a capability to which the group address is assigned or the device information (absent) indicating that the device has no capability to which the group address is assigned is registered. In addition, with regard to the device in which the group-belonging capability information is not acquired, the group-belonging capability information is left blank.

In the group address, the address value (GRPA value) indicating the group address assigned to a group to which the device belongs is registered as the device information. In addition, with regard to the device (the I2C device, the I3C device having no group-belonging capability information, or the like) having no stress in which the group address is assigned, the device information (absent) indicating the fact is registered. Further, in the group address, when the device has the stress in which the group address is assigned but the group address is not yet assigned to the device, the device information (not yet) indicating the fact is registered. Also, with regard to the device in which the group address is not acquired, the group address is left blank.

Also, as illustrated in FIG. 3B, in the device information table of I3C_v1.0, the function information, the static address (SA), and the dynamic address (DA) are registered as the device information from among the device information sets registered in the device information table of I3C_v1.1 while associated with the respective device IDs. That is, in I3C__v1.0, since the group address is not defined, the group information effective information, the group management capability information, the group-belonging capability information, and the group address are not registered in the device information table.

As described above, in the table holding unit 48, there is held the device information table in which an assignment state and the like of the static address, the dynamic address, or the group address are registered.

<Process at the Time of Receiving Mastership Request>

The process performed at the time when the current master 12C receives the mastership request will be described with reference to a flowchart illustrated in FIG. 4.

For example, when the current master 12C receives the mastership request transmitted by the secondary master 12S, the process starts. In Step S11, it is determined whether the current master 12C performs any response of non-permission, a request stop, and permission to the mastership request.

For example, in the state in which the current master 12C cannot receive the mastership request, in Step S11, it is determined that the current master 12C performs the response of non-permission to the mastership request and the process advances to Step S12. In Step S12, the current master 12C transmits a NACK response and the process ends.

In addition, in the state in which the mastership request cannot be received, when the request is stopped, in Step S11, it is determined that the current master 12C performs the response of request stop to the mastership request and the process advances to Step S13. Then, in Step S13, the current master 12C transmits the NACK response, in Step S14, transmits a disable command for prohibiting issuance of the mastership request, and the process ends.

On the other hand, in the state in which the mastership request can be received, in Step S11, it is determined that the current master 12C performs the response of permission to the mastership request, the process advances to Step S15, and transmits an ACK response.

In Step S16, the current master 12C refers to the device information table held by the table holding unit 48 and determines whether or not the secondary master 12S (the next master) that has transmitted the mastership request has the capability in which the group address is assigned. For example, the mastership request is transmitted by the dynamic address of the secondary master 12S that has issued the request and the address value and the group management capability information of the dynamic address are registered in the device information table of the current master 12C. Accordingly, the current master 12C can determine whether or not the secondary master 12S that has transmitted the mastership request has the capability in which the group address is assigned.

In Step S16, when the current master 12C determines that the secondary master 12S that has transmitted the mastership request has no capability in which the group address is assigned, the process advances to Step S17.

In Step S17, the current master 12C transmits a RST-GRPA (refer to FIG. 6 and FIG. 7 to be described below) for instructing the group address to be reset to all the I3C slaves 13 joining in the bus IF 11. Through this process, the group address held by the group address holding unit 56 of the I3C slave 13 in which the group address is registered is reset. In addition, at this time, the current master 12C resets also the group address registered in the device information table held by the table holding unit 48 of the current master 12C itself.

In Step S18, the current master 12C refers to the device information table held by the table holding unit 48 and determines whether or not the secondary master 12S having the capability in which the group address is assigned is present other than the current master 12C.

In Step S18, when the current master 12C determines that the secondary master 12S having the capability in which the group address is assigned is present, the process advances to Step S19.

In Step S19, the current master 12C transmits a DEFGRPS command for instructing information associated with the group address to be shared to the secondary master 12S having the capability in which the group address is assigned. Through this process, with the secondary master 12S having the capability in which the group address is assigned, the current master 12C shares the information associated with the group addresses of all the devices joining in the bus IF 11. That is, the current master 12C resets the group address in Step S17 and the group address of the device information table held by the table holding unit 48 of the secondary master 12S having the capability in which the group address is assigned is reset.

On the other hand, in Step S16, when the current master 12C determines that the secondary master 12S that has transmitted the mastership request has the capability in which the group address is assigned, the process advances to Step S20. Alternatively, in Step S18, when the current master 12C determines that the secondary master 12S having the capability in which the group address is assigned is not present and after the process of Step S19, the process advances to Step S20.

In Step S20, the current master 12C transmits a GETACCMST command for notifying the secondary master 12S that preparations for transferring the master authority are made to the secondary master 12S that has transmitted the mastership request, and issues a stop condition (P).

In Step S21, the current master 12C allows the data signal line 14 and the clock signal line 15 to be a high-impedance state (Hi-Z) and stops driving the bus IF 11, and then the process ends. Subsequently, the current master 12C behaves as the secondary master 12S.

As described above, for example, even if devices conforming to I3C_v1.1 and devices conforming to I3C_v1.0 are mixed in the bus IF 11, the current master 12C can appropriately reset and operate the group address so as to prevent contradictions from occurring in the group-related capability information of the device information table. At this time, the current master 12C can instruct all the I3C devices joining in the bus IF 11 to reset the group address. Alternatively, when contradictions are prevented from occurring in the group-related capability information of the device information table, the current master 12C may instruct the I3C slave 13 belonging to at least one group to reset the group address, for example.

<Process at the Time of Issuing Mastership Request>

Figure 5:
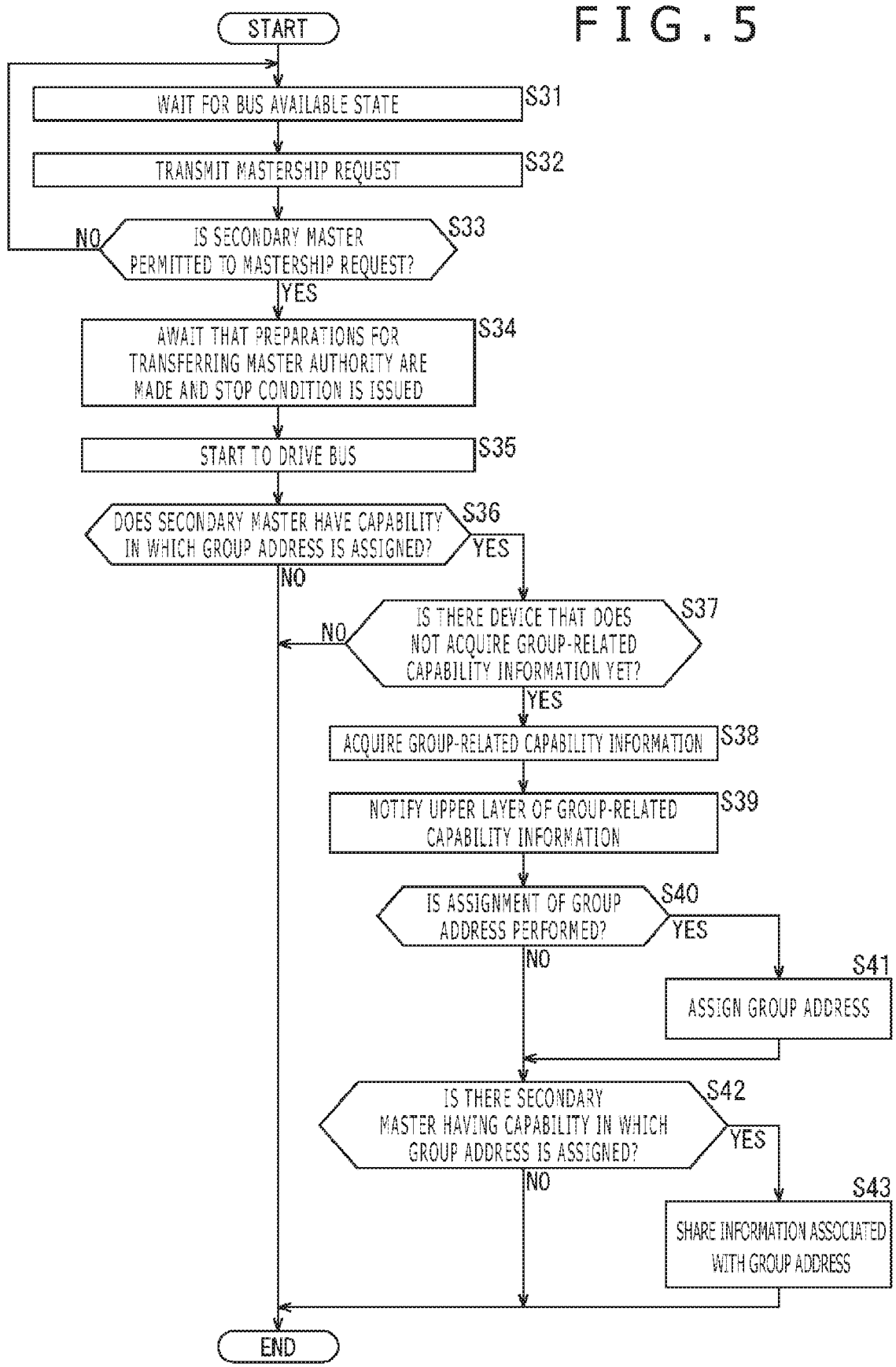
FIG. 5 is a flowchart describing a process at the time of issuing the mastership request.

The process performed at the time when the secondary master 12S issues the mastership request will be described with reference to a flowchart illustrated in FIG. 5.

In Step S31, when the secondary master 12S waits for a state in which the bus IF 11 becomes available (Bus Available) and confirms that the bus IF 11 is in the available state, the process advances to Step S32.

In Step S32, the secondary master 12S transmits the mastership request for requesting the master authority to the current master 12C.

In Step S33, it is determined whether or not the secondary master 12S is permitted to the mastership request transmitted in Step S32 and until it is determined that the secondary master 12S is permitted, the processes of Steps S31 and S32 are repeatedly performed. For example, when the mastership request wins an arbitration between the above processes and other processes and the ACK response is transmitted from the current master 12C, it can be determined that the secondary master 12S is permitted to the mastership request.

Then, in Step S33, when it is determined that the secondary master 12S is permitted to the mastership request transmitted in Step S32, the process advances to Step S34.

In Step S34, the secondary master 12S awaits that preparations for transferring the master authority are made in the current master 12C and the stop condition is issued. Then, in Step S20 of FIG. 4, when the current master 12C transmits the GETACCMST command and issues the stop condition (P), the secondary master 12S obtains the master authority and the process advances to Step S35.

In Step S35, the secondary master 12S that obtains the master authority starts to drive the bus IF 11.

In Step S36, when the secondary master 12S that obtains the master authority determines whether or not the secondary master 12S itself has the capability in which the group address is assigned and determines that the secondary master 12S itself has no capability in which the group address is assigned, the process ends.

On the other hand, in Step S36, when the secondary master 12S that obtains the master authority determines that the secondary master 12S itself has the capability in which the group address is assigned, the process advances to Step S37.

In Step S37, the secondary master 12S that obtains the master authority determines whether or not a device that does not acquire the group-related capability information yet is present. For example, when the device having insufficient group-related capability information is present in the device information table held by the table holding unit 48 of the secondary master 12S itself, the secondary master 12S that obtains the master authority can determine that the device that does not acquire the group-related capability information yet is present.

In Step S37, when the secondary master 12S that obtains the master authority determines that the device that does not acquire the group-related capability information yet is not present, the process ends. That is, in this case, the group-related capability information of all the devices is registered in the device information table held by the table holding unit 48 of the secondary master 12S that obtains the master authority.

On the other hand, in Step S37, when the secondary master 12S that obtains the master authority determines that the device that does not acquire the group-related capability information yet is present, the process advances to Step S38. That is, in this case, an insufficiency is caused in the group-related capability information in the device information table held by the table holding unit 48 of the secondary master 12S that obtains the master authority. For example, when the current master 12C that has transferred the master authority to the secondary master 12S has no capability in which the group address is assigned, an insufficiency may be caused in the group-related capability information.

In Step S38, the secondary master 12S that obtains the master authority transmits the CGETGRPCAP command for instructing transmission of the group-related capability information to be requested to the device that does not acquire the group-related capability information yet. In accordance with the above, when the secondary master 12S that obtains the master authority acquires the group-related capability information transmitted from the device to which the GETGRPCAP command is transmitted, the process advances to Step S39.

In Step S39, the secondary master 12S that obtains the master authority notifies the upper layer 22 of FIG. 2 of the group-related capability information acquired in Step S38. This process permits the upper layer 22 to grasp a correspondence of each I3C device to the group address and, for example, the upper layer 22 to determine the group address to be assigned to which I3C slave 13.

In Step S40, it is determined whether or not the secondary master 12S that obtains the master authority performs the assignment of the group address to the I3C slave 13. For example, when the assignment of the group address is instructed by the upper layer 22 that has performed determination on the basis of the group-related capability information, it can be determined that the secondary master 12S that obtains the master authority assigns the group address to the I3C slave 13 in accordance with the instruction.

In Step S40, when it is determined that the secondary master 12S that obtains the master authority performs the assignment of the group address, the process advances to Step S41. In Step S41, the secondary master 12S that obtains the master authority transmits the SETGRPA command for instructing the group address to be assigned and assigns the group address to the I3C slave 13 in accordance with the instruction from the upper layer 22.

On the other hand, in Step S40, when it is determined that the secondary master 12S that obtains the master authority does not perform the assignment of the group address or after the process of Step S41, the process advances to Step S42.

In Step S42, the secondary master 12S that obtains the master authority refers to the device information table held by the table holding unit 48 and determines whether or not other secondary masters 12S having the capability in which the group address is assigned are present other than the secondary master 12S that obtains the master authority.

In Step S42, when the secondary master 12S that obtains the master authority determines that the other secondary masters 12S having the capability in which the group address is assigned are present, the process advances to Step S43.

In Step S43, the secondary master 12S that obtains the master authority transmits the DEFGRPS command for instructing the information associated with the group address to be shared to the other secondary masters 12S having the capability in which the group address is assigned. Through this process, with the other secondary masters 12S having the capability in which the group address is assigned, the secondary master 12S that obtains the master authority shares the information associated with the group addresses of all the devices joining in the bus IF 11. For example, the secondary master 12S that obtains the master authority shares the group management capability information and the group-belonging capability information of respective devices joining in the bus IF 11. Further, when the group address is assigned to the I3C slave 13 in Step S41, the secondary master 12S that obtains the master authority shares the group address.

In Step S42, when the secondary master 12S that obtains the master authority determines that the other secondary masters 12S having the capability in which the group address is assigned are not present, or after the process of Step S43, the process ends. Subsequently, the secondary master 12S that obtains the master authority can behave as the current master 12C and perform communication using the dynamic address and the group address.

For example, even if the devices conforming to I3C_v1.1 and the devices conforming to I3C_v1.0 are mixed in the bus IF 11, the secondary master 12S that obtains the master authority can appropriately acquire and operate the group address, that is, so that an insufficiency is not caused in the group-related capability information of the device information table.

<Format Example of RSTGRPA Command>

In FIG. 6, a first format example of the RSTGRPA command transmitted in Step S17 of FIG. 4 is illustrated.

The RSTGRPA command (Broadcast) instructs all the I3C devices joining in the bus IF 11 to reset the group address.

In the example illustrated in FIG. 6, first, the current master 12C issues a start condition (S), transmits the address 7'h7E for designating all the devices joining in the bus IF 11, and continuously transmits a common command code (Broadcast RSTGRPA CCC) for instructing the group address to be reset.

Then, when the group address is not assigned, the device that has the group-belonging capability and receives the RSTGRPA command performs nothing, and when the group address is assigned, resets the group address of the device itself.

On the other hand, even if receiving the RSTGRPA command, the device having no group-belonging capability has to neglect the RSTGRPA command. In the standard of I3C_v1.0, for example, the device that receives the direct common command code (Broadcast CCC) not to be supported is regulated to neglect the direct common command code. Since the RSTGRPA command is not regulated in the standard of I3C_v1.0, the device conforming to I3C_v1.0 necessarily neglects the RSTGRPA command.

In addition, the master 12 having the capability in which the group address is assigned needs to be regulated in I3C_v1.1 so as to necessarily transmit the RSTGRPA command as illustrated in FIG. 6. On the other hand, in I3C_v1.1, the master 12 having no capability in which the group address is assigned needs to be regulated in I3C_v1.1 to be decided as the RSTGRPA command as illustrated in FIG. 6 not being transmitted.

In FIG. 7, a second format example of the RSTGRPA command is illustrated.

When at least one or more of the group addresses are assigned to a single I3C slave 13, the RSTGRPA command (Broadcast) illustrated in FIG. 7 is used on the occasion of resetting their group addresses.

Then, when one or more of the group addresses are assigned, the device that has the group-belonging capability and receives the RSTGRPA command resets all the group addresses of the device itself.

By using the RSTGRPA command of the format as described above, the current master 12C can reset the once-assigned group address to all the I3C devices joining in the bus IF 11.

<Communication Format Using Group Address>

The communication format used in the communication using the group address will be described with reference to FIG. 8 to FIG. 10.

In FIG. 8, an example of the communication format in the write transfer (I3C Directed CCC Write) is illustrated.

As illustrated in FIG. 8, the ACK is sent back from the I3C slave 13 to the group address (I3C Group Address) transmitted from the current master 12C setting to the destination a plurality of arbitrary I3C slaves 13, and then data (Optional Write Data) written setting the group to a target is transmitted. Then, transmission of the data in which the group address is set to the destination is performed for the necessary data amount.

Note that when multiple I3C slaves 13 send back the ACK and a portion of the I3C slaves 13 transmit the NACK among the plurality of I3C slaves 13 belonging to the same group, the current master 12C is also assumed to be incapable of recognizing the NACK but normal communication can be performed by performing correspondence using the error detection in subsequent communication processing.

In FIG. 9, an example of the communication format in the write transfer (I3C Private Write) and the readout transfer (I3C Private Read) is illustrated.

Among four communication formats illustrated in FIG. 9, two communication formats on the upper side represent those in the write transfer and two communication formats on the lower side represent those in the write transfer.

In the write transfer, the ACK is sent back from the I3C slave 13 to the group address (I3C Group Address) transmitted from the current master 12C setting to the destination the plurality of arbitrary I3C slaves 13 and then N pieces of data (Write Data-1 to Write Data-N) written setting the group to a target are transmitted.

In the readout transfer, with regard to the plurality of I3C slaves 13 belonging to the same group, N pieces of data (Read Data-1 to Read Data-N) are sequentially read out from respective I3C slaves 13. That is, the data read out from the plurality of I3C slaves 13 needs to be controlled so that a conflict is prevented from occurring and a timing at which the data is read out from the respective I3C slaves 13 is different from each other.

In FIG. 10, an example of the communication format in the write transfer (I3C Private Write) and the readout transfer (I3C Private Read) is illustrated.

In the similar manner as in the communication format illustrated in FIG. 9, in the write transfer, N pieces of data written setting the group to a target are transmitted and in the readout transfer, N pieces of data are sequentially read out for each I3C slave 13 of the same group.

In the group address (I3C Group Address) after the start condition (only S is included and Sr is not included), for example, the data transfer is performed at about 400 kHz by the open drain output from the current master 12C side. At this time, with regard to only a first one byte, the data transfer is performed by the open drain output and, with regard to subsequent bits (6 bit+R/W), the data transfer may be performed at 12.5 MHz by a push-pull output.

<Configuration Example of Computer>

Note that the respective processes described with reference to the above flowcharts are not necessarily executed in time series according to sequences described in the flowchart, but include processes (for example, parallel processes or processes by an object) that are executed in parallel or individually. In addition, a program may be processed by a single CPU or may be processed by a plurality of CPUs in a distributed manner.

In addition, the series of processes (communication method) described above can be executed by hardware or can be executed by software. When the series of processes are executed by the software, a program constituting the software is installed in a computer embedded in dedicated hardware or installed in, for example, a general-purpose personal computer in which various programs can be installed to execute various functions from a program recording medium in which a program is recorded.

FIG. 11 is a block diagram illustrating a configuration example (an example of a processing execution unit that executes the process executed by the master 12) of hardware of the computer that executes the series of processes described above by programs.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to each other through a bus 105. An input and output interface 106 is further connected to the bus 105 and the input and output interface 106 is connected to the outside (for example, the data signal line 14 and the clock signal line 15 of FIG. 1).

In the computer configured as described above, the CPU 101 loads and executes the program stored in, for example, the ROM 102 and the EEPROM 104, in the RAM 103 through the bus 105, and thus the series of processes described above are executed. In addition, the program executed by the computer (CPU 101) may be written in advance in the ROM 102, or installed and updated in the EEPROM 104 from the outside through the input and output interface 105.

<Combination Example of Configuration>

In addition, the present technology may also take the following configurations.

(1)

A communication device having a communication initiative through a bus, in which communication is performed with another communication device that performs communication under control of the communication device, another particular communication device that is capable of functioning as the communication device when the communication initiative is transferred from the communication device and performs communication under control of the communication device when having no communication initiative is treated as the other communication device in a state of having no communication initiative, and the communication device has a group management capability capable of managing a group address for performing a write transfer and performing communication setting a plurality of the other arbitrary communication devices to one group and setting the group to a destination, the communication device including:

a transmission and reception control unit configured to control transmission and reception of a signal with the other communication device that performs communication under control of the communication device; and a processing execution unit configured to execute a process for determining whether or not the other particular communication device that has performed a request has the group management capability in a case of transferring the communication initiative in accordance with the request by the other particular communication device, and a process for instructing the other communication device belonging to at least one group to reset the group address when it is determined that the other particular communication device has no group management capability.

(2)

The communication device according to the above (1), in which when it is determined that the other particular communication device that has requested the communication initiative has no group management capability, the processing execution unit performs a process for instructing all communication devices connected to the bus to reset the group address.

(3)

The communication device according to the above (1) or (2), in which when it is determined that the other particular communication device has the group management capability, the processing execution unit transfers the communication initiative in a state in which the group address is set.

(4)

The communication device according to any of the above (1) to (3), in which when a reset of the group address is performed and then the other particular communication device having the group management capability is present other than the other particular communication device that has requested the transfer of the communication initiative, the processing execution unit performs a process for sharing information associated with the group addresses of all the communication devices with the other particular communication device having the group management capability.

(5)

The communication device according to any of the above (1) to (4), in which in a case of starting to behave as the communication device, when group-related capability information associated with the group address of the other communication device joining in the bus is insufficient, the other particular communication device that obtains the communication initiative acquires the insufficient group-related capability information.

(6)

A communication method performed by a communication device having a communication initiative through a bus, in which communication is performed with another communication device that performs communication under control of the communication device, another particular communication device that is capable of functioning as the communication device when the communication initiative is transferred from the communication device and performs communication under control of the communication device when having no communication initiative is treated as the other communication device in a state of having no communication initiative, and the communication device has a group management capability capable of managing a group address for performing a write transfer and performing communication setting a plurality of the other arbitrary communication devices to one group and setting the group to a destination, the communication method including the steps of:

controlling transmission and reception of a signal with the other communication device that performs communication under control of the communication device;

determining whether or not the other particular communication device that has performed a request has the group management capability in a case of transferring the communication initiative in accordance with the request by the other particular communication device; and instructing the other communication device belonging to at least one group to reset the group address when it is determined that the other particular communication device has no group management capability.

(7)

A program for causing a computer built in a communication device having a communication initiative through a bus to execute a process, in which communication is performed with another communication device that performs communication under control of the communication device, another particular communication device that is capable of functioning as the communication device when the communication initiative is transferred from the communication device and performs communication under control of the communication device when having no communication initiative is treated as the other communication device in a state of having no communication initiative, and the communication device has a group management capability capable of managing a group address for performing a write transfer and performing communication setting a plurality of the other arbitrary communication devices to one group and setting the group to a destination, the process including the steps of:

controlling transmission and reception of a signal with the other communication device that performs communication under control of the communication device;

determining whether or not the other particular communication device that has performed a request has the group management capability in a case of transferring the communication initiative in accordance with the request by the other particular communication device; and instructing the other communication device belonging to at least one group to reset the group address when it is determined that the other particular communication device has no group management capability.

(8)

A communication system in which communication is performed by a communication device having a communication initiative through a bus and another communication device that performs communication under control of the communication device, in which another particular communication device that is capable of functioning as the communication device when the communication initiative is transferred from the communication device and performs communication under control of the communication device when having no communication initiative is treated as the other communication device in a state of having no communication initiative, the communication device has a group management capability capable of managing a group address for performing a write transfer and performing communication setting a plurality of the other arbitrary communication devices to one group and setting the group to a destination, and the communication device includes a transmission and reception control unit configured to control transmission and reception of a signal with the other communication device that performs communication under control of the communication device, and a processing execution unit configured to execute a process for determining whether or not the other particular communication device that has performed a request has the group management capability in a case of transferring the communication initiative in accordance with the request by the other particular communication device, and a process for instructing the other communication device belonging to at least one group to reset the group address when it is determined that the other particular communication device has no group management capability.

(9)

A communication device that is capable of functioning as another particular communication device when a communication initiative is transferred from the other particular communication device having the communication initiative through a bus and performs communication under control of the other particular communication device when having no communication initiative, in which the communication device has a group management capability capable of managing a group address for performing a write transfer and performing communication setting a plurality of other arbitrary communication devices to one group and setting the group to a destination, the communication device including:

a transmission and reception control unit configured to control transmission and reception of a signal with the other particular communication device; and a processing execution unit configured to execute a process for requesting the communication initiative from the other particular communication device, and a process for acquiring, in a case of obtaining the communication initiative and starting to behave as the other particular communication device when the group-related capability information associated with the group address of the other communication device joining in the bus is insufficient, the insufficient group-related capability information.

(10)

The communication device according to the above (9), in which the processing execution unit performs a process for sharing information associated with the group addresses of all the communication devices with the other communication device having the group management capability.

(11)

A communication method performed by a communication device that is capable of functioning as another particular communication device when a communication initiative is transferred from the other particular communication device having the communication initiative through a bus and performs communication under control of the other particular communication device when having no communication initiative, in which the communication device has a group management capability capable of managing a group address for performing a write transfer and performing communication setting a plurality of other arbitrary communication devices to one group and setting the group to a destination, the communication method including the steps of:

controlling transmission and reception of a signal with the other particular communication device;

requesting the communication initiative from the other particular communication device; and acquiring, in a case of obtaining the communication initiative and starting to behave as the other particular communication device when group-related capability information associated with the group address of the other communication device joining in the bus is insufficient, the insufficient group-related capability information.

(12)

A program for causing a computer built in a communication device that is capable of functioning as another particular communication device when a communication initiative is transferred from the other particular communication device having the communication initiative through a bus and performs communication under control of the other particular communication device when having no communication initiative to execute a process, in which the communication device has a group management capability capable of managing a group address for performing a write transfer and performing communication setting a plurality of other arbitrary communication devices to one group and setting the group to a destination, the process including the steps of:

controlling transmission and reception of a signal with the other particular communication device;

requesting the communication initiative from the other particular communication device; and acquiring, in a case of obtaining the communication initiative and starting to behave as the other particular communication device when group-related capability information associated with the group address of the other communication device joining in the bus is insufficient, the insufficient group-related capability information.

(13)

A communication system in which communication is performed by another particular communication device having a communication initiative through a bus, another communication device that performs communication under control of the communication device, and the communication device that is capable of functioning as the other particular communication device when the communication initiative is transferred from the other particular communication device having the communication initiative through a bus and performs communication under control of the other particular communication device when having no communication initiative, in which the communication device has a group management capability capable of managing a group address for performing a write transfer and performing communication setting a plurality of other arbitrary communication devices to one group and setting the group to a destination, and the communication device includes a transmission and reception control unit configured to control transmission and reception of a signal with the other particular communication device, and a processing execution unit configured to execute a process for requesting the communication initiative from the other particular communication device, and a process for acquiring, in a case of obtaining the communication initiative and starting to behave as the other particular communication device when group-related capability information associated with the group address of the other communication device joining in the bus is insufficient, the insufficient group-related capability information.

Note that the present embodiment is not limited to the embodiment described above and various modifications can be made without departing from the spirit and scope of the present disclosure. Also, the effects described in the present specification are merely illustrative and are not limitative, and other effects may be described therein.

REFERENCE SIGNS LIST

11 Bus IF
12-1 to 12-3 Master
13-1 to 13-6 Slave
14 Data signal line
15 Clock signal line
21 Master device
22 Upper layer
31 Slave device
32 Upper layer
41 Transmission and reception control unit
42 Data reception unit
43 Data transmission unit
44 Mastership request control unit
45 Command interpretation unit
46 Information holding unit
47 Command transmission unit
48 Table holding unit
51 Transmission and reception control unit
52 Data reception unit
53 Data transmission unit
54 Hot join request control unit
55 Dynamic address holding unit
56 Group address holding unit
57 Command interpretation unit
58 Information holding unit

The invention claimed is:

1. A primary communication device having a communication initiative through a bus, the primary communication device comprising:

communication circuitry configured to communicate with a plurality of secondary communication devices, wherein the plurality of secondary communication devices are configured to perform communication under control of the primary communication device; and control circuitry configured to:

cause the primary communication device to receive a mastership request from a respective secondary communication device, determine that the respective secondary communication device has a group address assignment capability, and upon determining that the respective secondary communication device has the group address assignment capability, cause the primary communication device to inform the respective secondary communication device of an assigned group address information.

2. The primary communication device according to claim 1, wherein, in a case where the respective secondary communication device does not have the group address assignment capability, the control circuitry is configured to determine whether any of the plurality of secondary communication devices have the group address assignment capability.

3. The primary communication device according to claim 1, further comprising a register, wherein the control circuitry is configured to determine whether the respective secondary communication device has the group address assignment capability based on a table held in the register.

4. The primary communication device according to claim 1, wherein the control circuitry is configured to cause the primary communication device to issue a read command, and
a group address is prohibited to be designated in the read command.

5. The primary communication device according to claim 1, wherein the assigned group address information includes information corresponding to an I3C version state of the corresponding second communication device.

6. The primary communication device according to claim 1, wherein the assigned group address information includes information representing a number of assignable group address slots of the corresponding second communication device.

7. The primary communication device according to claim 1, wherein the communication circuitry and/or the control circuitry are respectively configured from a semiconductor integrated circuit.

8. The primary communication device according to claim 1, wherein the control circuitry is configured to cause the primary communication device to issue a write command to those among the plurality of secondary communication devices having a particular group address.

9. The primary communication device according to claim 8, wherein the primary communication device is configured to receive an acknowledgment from those among the plurality of secondary communication devices having the particular group address, in response to the write command.

10. A secondary communication device configured to perform communication through a bus under control of a primary communication device, the secondary communication device comprising:

communication circuitry configured to communicate with the primary communication device and with a plurality of tertiary communication devices; and control circuitry configured to:

send a mastership request to the primary communication device, cause the primary communication device to determine that the respective secondary communication device has a group address assignment capability, upon determining that the secondary communication device has the group address assignment capability, cause the primary communication device to inform the respective secondary communication device of an assigned group address information, and cause the secondary communication device to start driving the bus.

11. The secondary communication device according to claim 10, wherein
the control circuitry is configured to cause the secondary communication device to issue a read command, and a group address is prohibited to be designated in the read command.

12. The secondary communication device according to claim 10, wherein the assigned group address information includes information corresponding to an I3C version state of the primary communication device and/or at least one of the plurality of tertiary communication devices.

13. The secondary communication device according to claim 10, wherein the assigned group address information includes information includes information representing a number of assignable group address lots of the primary communication device and/or at least one of the plurality of tertiary communication devices.

14. The secondary communication device according to claim 10, wherein the communication circuitry and/or the control circuitry are respectively configured from a semiconductor integrated circuit.

15. The secondary communication device according to claim 10, wherein the control circuitry is configured to cause the secondary communication device to issue a write command to those among the primary communication device and the plurality of tertiary communication devices having a particular group address.

16. The secondary communication device according to claim 15, wherein the primary communication device is configured to receive an acknowledgment from those among the primary communication device and the plurality of tertiary communication devices having the particular group address, in response to the write command.

17. A communication system comprising:

a primary communication device having a communication initiative through a bus;

a secondary communication device configured to perform communication through the bus under control of the primary communication device and capable of receiving the communication initiative through the bus; and at least one tertiary communication device configured to perform communication under control of the primary communication device or the secondary communication device, wherein the primary communication device includes:

first communication circuitry configured to communicate with the secondary communication device and the at least one tertiary communication device, and first control circuitry configured to:

cause the primary communication device to receive a mastership request from the secondary communication device, determine that the secondary communication device has a group address assignment capability, and upon determining that the secondary communication device has the group address assignment capability, cause the primary communication device to inform the secondary communication device of an assigned group address information.

18. The communication system according to claim 17, wherein the secondary communication device includes:

secondary communication circuitry configured to communicate with the primary communication device and with the at least one tertiary communication device; and second control circuitry configured to:

cause the secondary communication device to start driving the bus, and cause the secondary communication device to acquire a respective capability information from the primary communication device and/or the tertiary communication device.

* * * * *